Patented Oct. 25, 1938

2,134,340

UNITED STATES PATENT OFFICE 2,134,340

HEAT INSULATION

Jesse Hopkins Plummer, Newark, Ohio, assignor to Owens-Illinois Glass Company, a corporation of Ohio No Drawing. Application October 3, 1935, Serial No. 43,389. Renewed April 1, 1938

11 Claims. (Cl. 154—44)

My invention relates to heat insulating materials and, more particularly, to insulation for use with moderately high temperatures, as, for example, stove insulation, to be used at temperatures of 1000° F. or lower. The invention in its preferred form involves the use of low density inorganic insulating material such as glass wool or other inorganic fibrous materials in bulk, in matted, or in felted form.

An object of the invention is to improve the insulating qualities of such materials by the combination therewith of a loading material of a character to greatly reduce the heat radiation.

For the purpose of describing the theory involved in the present invention, I refer to glass wool in matted or felted form as an example of a base which I have employed with good results in practicing the invention. This base may consist of fine glass fibers in bulk and having a low density, as, for example, three pounds per cubic foot. When such an insulating base has added thereto a loading material which is transparent to that portion of the infra-red heat rays where the energy is greatest, the insulating properties of the material are greatly improved.

The theory behind the use of such a loading material may be described as follows: A large part of the heat energy which escapes through any insulation of the character indicated, is transmitted by radiation. This energy does not necessarily have to pass through the material in the form of unbroken rays, but may be absorbed and re-radiated repeatedly by the fibers or the like comprising the insulation. All materials which have a high absorption coefficient for the radiation in question, also strongly emit when heated. If, then, the heat radiation can be blocked by some material which has a very low emissive power, the insulating efficiency of a low density material may be greatly increased.

According to my invention, this is done by employing a substance which is transparent to the short wave-length infra-red heat rays, and loading it into the insulation base as a finely divided powder. Radiation from a hot surface covered by such insulation, is so weakened by multiple reflections from the enormous surface area of these powder particles, that virtually none of it penetrates any substantial distance into the body of insulation, and there is practically no re-radiation since such a substance does not radiate strongly when heated. Calcium fluoride is an example of a substance known to be transparent to that portion of the infra-red where the energy is greatest.

I have demonstrated by tests that powdered calcium fluoride when added as a loading material to glass wool, materially increases its insulating properties. For example, I have loaded glass wool having a density of three pounds per cubic foot with one-third its weight of powdered calcium fluoride. Tests of this material with a hot surface temperature of 600° F. and a cold surface temperature of 65° F., show that the amount of heat transmitted is much less than when the said loading material is omitted and also much less than if the same glass wool is packed at a density of four pounds per cubic foot, or, in other words, having the same density as the combined glass wool and packing of calcium fluoride. Tests of the character indicated have demonstrated that the calcium flouride exerts a much greater influence upon the insulating coefficient than the same quantity of glass wool.

As a further example of comminuted material which is transparent to the shorter infra-red heat rays, silica in powdered form may be noted as one of the materials which I have found to be suitable for the purposes of the present invention. The alkali halides may also be noted. These included the salts consisting of sodium, potassium or calcium combined with elements of the halogen group (comprising chlorine, fluorine, bromine and iodine).

It may be noted that with the insulating materials of the general character herein referred to, there is very little heat transmitted by conduction and convection. Accordingly, any means for reducing the amount of radiation in the manner above described will correspondingly increase the effectiveness of the material as a heat insulator.

Modifications may be resorted to within the spirit and scope of my invention.

I claim:

1. An insulating material comprising a base of inorganic solid material in open formation presenting a large surface area dispersed throughout the body of said material, and a comminuted loading material forming a coating for said surface, said loading material being a substance which is transparent to the portion of the infra-red rays within the zone of greatest heat energy.

2. An insulating material comprising a base of inorganic solid material in open formation presenting a large surface area dispersed throughout the body of said material, and a comminuted loading material forming a coating for said surface, said coating material consisting of calcium fluoride.

3. A high temperature heat insulating material comprising a low density base of inorganic fibrous material, and a coating for said base of powdered material which is substantially transparent to high temperature infra-red rays.

4. A high temperature heat insulating material comprising a low density base of inorganic fibrous material, and a powdered coating material for said base presenting a large surface area for radiation and consisting of a material which is transparent to that portion of the infra-red where the energy is greatest.

5. A high temperature insulation comprising a low density base consisting of glass fibers in matted or felted form, and a loading material transparent to that portion of the infra-red heat rays where the energy is greatest.

6. A low density insulating material comprising a base of inorganic fibrous material in matted or in felted form, and a loading material forming a coating for said base and greatly increasing the radiating surface area of the insulation, said loading material being transparent to that portion of the infra-red heat rays where the heat energy is greatest.

7. A low density insulating material comprising a base of inorganic fibrous material in matted or in felted form, and a loading material forming a coating for said base and greatly increasing the radiating surface area of the insulation, said loading material consisting of calcium fluoride.

8. A high temperature insulation comprising a low density base consisting of glass fibers in matted or felted form, and a loading material forming a coating for said fibers, said loading material consisting of calcium fluoride.

9. An insulating material comprising a base of inorganic solid material in open formation presenting a large surface area dispersed throughout the body of said material, and a comminuted loading material forming a coating for said surface, said loading material consisting of silica in comminuted form.

10. A high temperature heat insulating material comprising a low density base of inorganic material in open formation presenting a large surface area dispersed throughout the body of said material, and an alkali halide in powdered form and substantially transparent to high temperature infra-red rays.

11. A low density insulating material comprising a base of inorganic fibrous material in matted or felted form, and a loading material in comminuted form forming a coating for said base and greatly increasing the radiating surface area of the insulation, said loading material consisting of an alkali halide which is substantially transparent to that portion of the infra-red heat rays where the heat energy is greatest.

JESSE HOPKINS PLUMMER.